Patented Dec. 14, 1926.

1,610,703

UNITED STATES PATENT OFFICE.

HERMAN W. OLSON, OF CLEVELAND, OHIO.

COMPOSITION TO PREVENT CORROSION.

No Drawing.   Application filed October 20, 1923. Serial No. 669,859.

One of the objects of my invention is the production of a composition to be applied to the surface of articles for the purpose of preventing corrosion. Another object is the production of a composition to be applied to the surfaces of composite articles for the purpose of preventing corrosion of all of the parts of these articles. Another object is the production of a composition to be applied to the surfaces of articles, composite or otherwise, for the purpose of preventing corrosion thereof and of electrically insulating these articles. Another object is the production of a composition which does not harden after it is applied.

My composition consists, principally, of a base ingredient, of fatty, greasy, or unctuous nature which does not harden, mixed with other ingredients adapted to meet the objects of the present invention.

As an example, I will describe in detail a composition found to give excellent results to prevent corrosion of the terminal connections of an electric storage battery.

For such a composition I use a fatty or greasy substance as a base, such as grease, petroleum jelly, tallow, paraffin, etc., and, preferably, thin this composition with a suitable agent, such as oils, so that the same can be applied with a brush similar to paint. This base, due to its fatty nature, is not only an electric insulator but also has the property of not hardening after it is applied so that the terminal connections can readily be disconnected at any time.

To prevent corrosion, due to the acid fumes usually found in connection with storage batteries or due to atmospheric or other conditions, I mix with a base of the character described above sufficient of an ammoniacal compound or ingredient to counteract the corrosive effects set forth above. This ammoniacal compound or ingredient, when in the form of the ammonia salts, such as ammonium chloride, may be mixed with such a base without the application of heat but, when in the form of aqua-ammonia or ammonium hydrate, the ingredients are more thoroughly mixed and combined when the mass is heated.

As a further prevention of corrosion, I may also mix with a base of the character described, or with the mixture described in the preceding paragraph, sufficient soda to counteract the corrosive effects set forth above.

As a practical example; a composition to attain the objects of the present invention, made up of ingredients readily procurable and well known, is compounded as follows: One half gallon of aqua ammonia, five pounds of baking soda, ten pounds of grease such as is used for lubricating purposes and one gallon of oil such as is used for lubricating purposes and thoroughly mix these ingredients preferably while heated to attain a thorough mixture.

The grease and the oil form the base for the compound. When the resultant compound is to be in the form of a paste, the quantity of grease should predominate while the quantity of oil should predominate when an easier flowing or paint like compound is desired.

It is to be understood, however, that the consistency of the base may be made heavier than the consistency of the paint previously mentioned so that the compound or composition can be formed and applied like paste; that other ingredients may be used in suitable proportions to accomplish the objects of the present invention; and that the proportions of the ingredients may be varied to a wide degree depending upon the materials to be protected.

My composition is easily applied, does not harden to lock the joints of a composite structure, electrically insulates the articles to which it is applied, does not deteriorate readily, and prevents corrosion of metallic as well as non-metallic materials.

I claim:—

1. A compound to prevent corrosion, comprising, an ammoniacal ingredient, and sodium bicarbonate, both mixed with a mineral fatty ingredient to form the compound.

2. A compound to prevent corrosion, comprising, an ammoniacal ingredient, and sodium bicarbonate, both mixed with an electrically insulating ingredient to form the compound.

3. A compound to prevent corrosion, comprising, an ammoniacal ingredient, sodium bicarbonate, and a mineral fatty ingredient; all of said ingredients mixed to form the compound and adapted to prevent the corrosion on an article which is subjected to acid-electric action.

HERMAN W. OLSON.